US012566110B2

(12) United States Patent
Shomura et al.

(10) Patent No.: US 12,566,110 B2
(45) Date of Patent: Mar. 3, 2026

(54) TRIGGER CONDITION DETERMINATION METHOD FOR TIME SERIES SIGNAL, ABNORMALITY DIAGNOSIS METHOD FOR EQUIPMENT TO BE MONITORED, AND TRIGGER CONDITION DETERMINATION DEVICE FOR TIME SERIES SIGNAL

(71) Applicant: JFE STEEL CORPORATION, Tokyo (JP)

(72) Inventors: Kei Shomura, Tokyo (JP); Takehide Hirata, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 405 days.

(21) Appl. No.: 18/039,799

(22) PCT Filed: Dec. 8, 2020

(86) PCT No.: PCT/JP2020/045563
§ 371 (c)(1),
(2) Date: Jun. 1, 2023

(87) PCT Pub. No.: WO2022/123640
PCT Pub. Date: Jun. 16, 2022

(65) Prior Publication Data
US 2024/0027304 A1     Jan. 25, 2024

(51) Int. Cl.
*G01M 99/00*       (2011.01)
*G06N 20/00*       (2019.01)

(52) U.S. Cl.
CPC .......... *G01M 99/005* (2013.01); *G06N 20/00* (2019.01)

(58) Field of Classification Search
CPC ....... G01M 99/005; G06N 20/00; G06N 5/01; G06N 20/20; G06F 18/10; G06F 2218/10;
(Continued)

(56) References Cited

U.S. PATENT DOCUMENTS 10,223,175 B2 *   3/2019   Rope ..................... G06F 11/079
11,023,045 B2     6/2021   Liu et al.
(Continued)

FOREIGN PATENT DOCUMENTS

CN      109716303 A      5/2019
CN      110431570 A      11/2019
(Continued)

OTHER PUBLICATIONS

Feb. 9, 2021 International Search Report issued in International Patent Application No. PCT/JP2020/045563.
(Continued)

*Primary Examiner* — Manuel A Rivera Vargas

(57)     ABSTRACT

A trigger condition determination method for a time series signal determines a trigger condition for cutting out a monitored section being a target for abnormality diagnosis, from a monitored signal being a time series signal indicating a condition of a monitored facility in the abnormality diagnosis for the monitored facility, and includes: collecting signal groups including one or more monitored signals and a trigger candidate signal; cutting out the monitored section of the monitored signal; generating a learning model specifying a start time point of the cut-out monitored section, generating label data, and using one or more trigger candidate signals at each time point as an input and using the label data at each time point as an output, by using machine learning; and determining the trigger condition by using the learning model, for the monitored signal for which the abnormality diagnosis is performed.

7 Claims, 8 Drawing Sheets

(58) Field of Classification Search
CPC ... G06F 18/22; G06F 18/2433; G05B 23/024; G05B 23/0243; G05B 23/0221
See application file for complete search history.

(56) References Cited

U.S. PATENT DOCUMENTS

| | | | |
|---|---|---|---|
| 2010/0250195 A1 | 9/2010 | Whaley et al. | |
| 2012/0290879 A1 | 11/2012 | Shibuya et al. | |
| 2015/0269050 A1* | 9/2015 | Filimonov | G06Q 10/0639 |
| | | | 702/183 |
| 2016/0148103 A1* | 5/2016 | Sarrafzadeh | G06N 20/00 |
| | | | 706/46 |
| 2018/0082201 A1 | 3/2018 | Cantwell | |
| 2019/0042618 A1* | 2/2019 | Potulska | G06N 5/01 |
| 2019/0227504 A1* | 7/2019 | Ma | G05B 13/042 |
| 2020/0183946 A1* | 6/2020 | Pelloin | G06F 17/18 |
| 2020/0210873 A1 | 7/2020 | Cantwell | |
| 2020/0327708 A1 | 10/2020 | Garvey et al. | |
| 2020/0393812 A1* | 12/2020 | Ishikawa | G06F 17/18 |
| 2021/0223765 A1 | 7/2021 | Nakabayashi et al. | |
| 2021/0319368 A1* | 10/2021 | Motegi | G05B 23/024 |
| 2021/0383250 A1 | 12/2021 | Uejima | |
| 2022/0058174 A1* | 2/2022 | Lemberg | G06F 11/3075 |

FOREIGN PATENT DOCUMENTS

| | | |
|---|---|---|
| CN | 111309539 A | 6/2020 |
| JP | 2020-197980 A | 12/2020 |
| TW | 201812686 A | 4/2018 |
| TW | 202036245 A | 10/2020 |
| WO | 2017/104305 A1 | 6/2017 |
| WO | 2019/230282 A1 | 12/2019 |
| WO | 2020/136836 A1 | 7/2020 |

OTHER PUBLICATIONS

Nov. 4, 2021 Notice of Reasons for Refusal issued in Taiwanese Patent Application No. 109143187.
Mar. 30, 2024 Office Action issued in Chinese Patent Application No. 202080107703.8.
Jan. 5, 2024 Extended Search Report issued in European Patent Application No. 20965026.6.

* cited by examiner

FIG.2

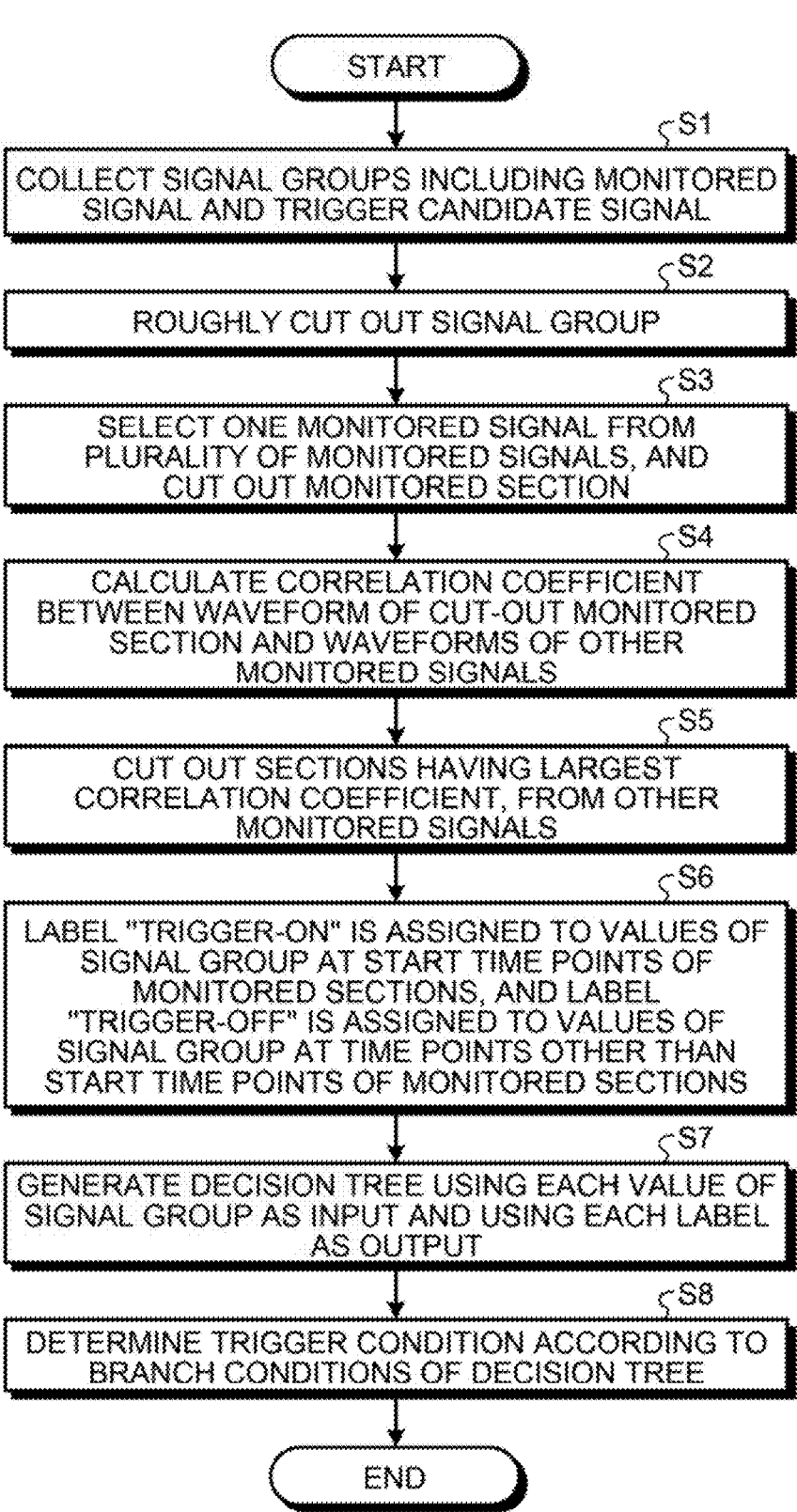

START

S1
COLLECT SIGNAL GROUPS INCLUDING MONITORED SIGNAL AND TRIGGER CANDIDATE SIGNAL

S2
ROUGHLY CUT OUT SIGNAL GROUP

S3
SELECT ONE MONITORED SIGNAL FROM PLURALITY OF MONITORED SIGNALS, AND CUT OUT MONITORED SECTION

S4
CALCULATE CORRELATION COEFFICIENT BETWEEN WAVEFORM OF CUT-OUT MONITORED SECTION AND WAVEFORMS OF OTHER MONITORED SIGNALS

S5
CUT OUT SECTIONS HAVING LARGEST CORRELATION COEFFICIENT, FROM OTHER MONITORED SIGNALS

S6
LABEL "TRIGGER-ON" IS ASSIGNED TO VALUES OF SIGNAL GROUP AT START TIME POINTS OF MONITORED SECTIONS, AND LABEL "TRIGGER-OFF" IS ASSIGNED TO VALUES OF SIGNAL GROUP AT TIME POINTS OTHER THAN START TIME POINTS OF MONITORED SECTIONS

S7
GENERATE DECISION TREE USING EACH VALUE OF SIGNAL GROUP AS INPUT AND USING EACH LABEL AS OUTPUT

S8
DETERMINE TRIGGER CONDITION ACCORDING TO BRANCH CONDITIONS OF DECISION TREE

END

FIG.4
(a)
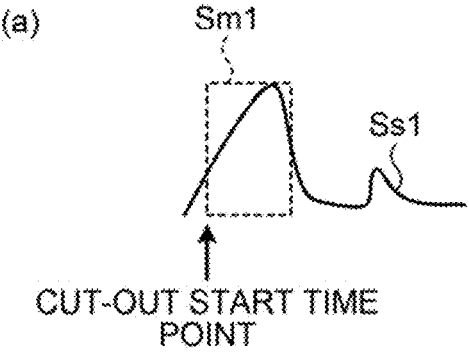
Sm1
Ss1
CUT-OUT START TIME
POINT
(b)
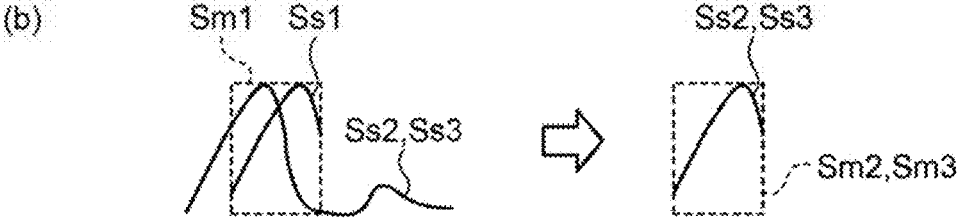
Sm1   Ss1
Ss2,Ss3
Ss2,Ss3
Sm2,Sm3
FIG.5
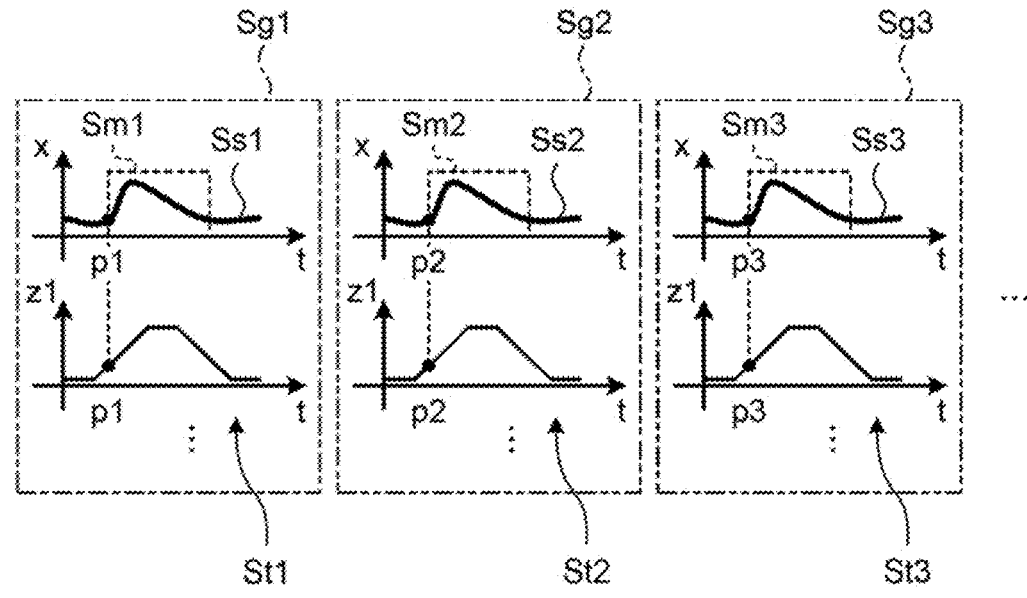
Sg1
Sg2
Sg3
Sm1   Ss1
Sm2   Ss2
Sm3   Ss3
p1
p2
p3
St1
St2
St3

(1)EXTRACT TRIGGER CONDITIONS "v5<-5.5" AND
"13290≤v2<14370" FROM DECISION TREE
(2)DETERMINE "v2=13830" AS TRIGGER CONDITION

TRIGGER CONDITION DETERMINATION METHOD FOR TIME SERIES SIGNAL, ABNORMALITY DIAGNOSIS METHOD FOR EQUIPMENT TO BE MONITORED, AND TRIGGER CONDITION DETERMINATION DEVICE FOR TIME SERIES SIGNAL

FIELD

The present invention relates to a trigger condition determination method for a time series signal, an abnormality diagnosis method for a monitored facility, and a trigger condition determination device for a time series signal.

BACKGROUND

Production facility of a factory or the like and an experimental facility of a laboratory or the like has the following method, as one of methods of performing abnormality diagnosis for a facility. First, when a facility being a monitoring target (hereinafter, referred to as "a monitored facility") is normally operated, data of a time series signal (hereinafter, referred to as "monitored signal") indicating a condition of the monitored facility is collected, and a large number of pieces of the data of the time series signals collected are used to create a model of normal operation of the monitored facility. Then, in abnormality diagnosis of the monitored facility, a distance from the model is calculated, and the distance exceeding a predetermined threshold is determined as abnormal. For example, Patent Literature 1 discloses an abnormality diagnosis method using a principal component plane for the model.

CITATION LIST

Patent Literature

Patent Literature 1: WO 2017/104305 A

SUMMARY

Technical Problem

In conventional abnormality diagnosis methods including Patent Literature 1, specifically, abnormality diagnosis has been performed according to the following procedure.

(1) A time series signal at a point N is cut out from each of the collected monitored signals.
(2) The cut-out time series signals are each expressed at one point in an N-dimensional space, and a reference is created.
(3) A Q statistic (distance from a principal component plane) is calculated for a signal being a target for abnormality diagnosis.
(4) When the Q statistic exceeds a predetermined threshold, it is determined that there is an abnormality.

In the conventional abnormality diagnosis methods, as described in (1) above, a monitored section is cut out from each of the monitored signals to create the model of the normal operation of the monitored facility. In addition, upon abnormality diagnosis of the monitored facility, the monitored section is cut out from the monitored signal, and the distance to the model created from the monitored signal during the normal operation is calculated. Here, for ease of description, a condition to specify timing with which the monitored section is cut out from the monitored signal is referred to as "trigger condition," and a time series signal that can be the trigger condition is referred to as "trigger candidate signal."

In order to create an appropriate model of the monitored facility during normal operation, when the monitored sections that are cut out from a plurality of collected monitored signals about the monitored facility are overlaid, waveforms cut out need to overlap each other to some extent. In the conventional abnormality diagnosis methods, specifically, the waveforms in the monitored sections are superimposed according to the following procedure.

(1) The monitored section is cut out from each of the plurality of monitored signals by using the trigger condition.
(2) The horizontal axis of each monitored section is converted (e.g., the time indicated by the horizontal axis is converted to a crank angle or the like).
(3) The vertical axis of each monitored section is converted (e.g., normalized).

In the conventional abnormality diagnosis methods, the trigger condition of (1) described above is manually determined so that the cut-out waveforms overlap each other, for example, by comparing the monitored signal and the trigger candidate signal, and it takes time and effort to determine the trigger condition.

The present invention has been made in view of the above description, and an object of the present invention is to provide a trigger condition determination method for a time series signal, an abnormality diagnosis method for a monitored facility, and a trigger condition determination device for a time series signal that are configured to automatically determine a trigger condition for cutting out a monitored section from a monitored signal.

Solution to Problem

To solve the above-described problem and achieve the object, a trigger condition determination method for a time series signal according to the present invention determines a trigger condition that is a condition for cutting out a monitored section being a target for abnormality diagnosis, from a monitored signal being a time series signal indicating a condition of a monitored facility in the abnormality diagnosis for the monitored facility, and includes: a collection step of collecting signal groups including one or more monitored signals and a trigger candidate signal, the one or more monitored signals relating to the monitored facility, the trigger candidate signal being a time series signal relating to the monitored facility and detected at a same time as the monitored signal, and representing a time series signal that is able to be the trigger condition; a cut-out step of cutting out the monitored section of the monitored signal, based on a predetermined criterion, from the signal groups; a model generation step of generating, for the signal groups, a learning model specifying a start time point of the cut-out monitored section, generating label data in which a label for the start time point is turned on and a label for any other time point is turned off, and using one or more trigger candidate signals at each time point as an input and using the label data at each time point as an output, by using machine learning; and a trigger condition determination step of determining the trigger condition by using the learning model, for the monitored signal for which the abnormality diagnosis is performed.

Moreover, in the above-described trigger condition determination method for a time series signal according to the present invention, in the cut-out step, a monitored section is cut out based on a facility characteristic of the monitored facility, from a first monitored signal, selected from a plurality of the monitored signals collected in the collection step; and a section having a largest correlation coefficient with a waveform included in the monitored section of the first monitored signal is searched for to cut out the monitored section, from each of the monitored signals other than the first monitored signal, of the plurality of the monitored signals.

Moreover, in the above-described trigger condition determination method for a time series signal according to the present invention, the learning model is a decision tree.

Moreover, in the above-described trigger condition determination method for a time series signal according to the present invention, in the model generation step, when the trigger candidate signal is one pulse signal, the machine learning is performed after the trigger candidate signal is converted to a sawtooth wave.

Moreover, in the above-described trigger condition determination method for a time series signal according to the present invention, in the model generation step, when accuracy in determination provides no predetermined value in the machine learning, the process returns to the cut-out step, the monitored section that has been cut out last time is shifted back and forth, a new monitored section of the monitored signal is cut out, and the model generation step is performed again.

To solve the above-described problem and achieve the object, an abnormality diagnosis method for a monitored facility according to the present invention includes: cutting out and accumulating signals in a monitored section being a target for abnormality diagnosis, from a monitored signal being a time series signal indicating a condition of a monitored facility, according to a trigger condition determined by the above-described trigger condition determination method for a time series signal; and performing the abnormality diagnosis for the monitored facility based on the accumulated signals.

To solve the above-described problem and achieve the object, a trigger condition determination device for a time series signal according to the present invention determines a trigger condition that is a condition for cutting out a monitored section being a target for abnormality diagnosis, from a monitored signal being a time series signal indicating a condition of a monitored facility in abnormality diagnosis for the monitored facility, and includes: a collection unit configured to collect signal groups including one or more monitored signals and a trigger candidate signal, the one or more monitored signals relating to the monitored facility, the trigger candidate signal being a time series signal relating to the monitored facility and detected at a same time as the monitored signal, and representing a time series signal that is able to be the trigger condition; a cut-out unit configured to cut out the monitored section of the monitored signal, based on a predetermined criterion, from the signal group; a model generation unit configured to, for the signal group, generate a learning model specifying a start time point of the cut-out monitored section, generate label data in which a label for the start time point is turned on and a label for any other time point is turned off, and use one or more trigger candidate signals at each time point as an input and using the label data at each time point as an output, by using machine learning; and a trigger condition determination unit configured to determine the trigger condition by using the learning model, for the monitored signal for which the abnormality diagnosis is performed.

Advantageous Effects of Invention

According to the present invention, it is possible to automatically determine the trigger condition for cutting out the monitored section from the monitored signal by using a learning model that has trained to learn whether trigger-on is provided when the monitored signal and the trigger candidate signal have what condition.

BRIEF DESCRIPTION OF DRAWINGS

FIG. 2 is a flowchart illustrating a process of a trigger condition determination method for a time series signal according to an embodiment of the present invention.

FIG. 4 is a diagram schematically illustrating a content of the cut-out step of the trigger condition determination method for a time series signal according to the embodiment of the present invention.

FIG. 5 is a diagram schematically illustrating the content of a model generation step of the trigger condition determination method for a time series signal according to an embodiment of the present invention.

DESCRIPTION OF EMBODIMENTS

Figure 1:
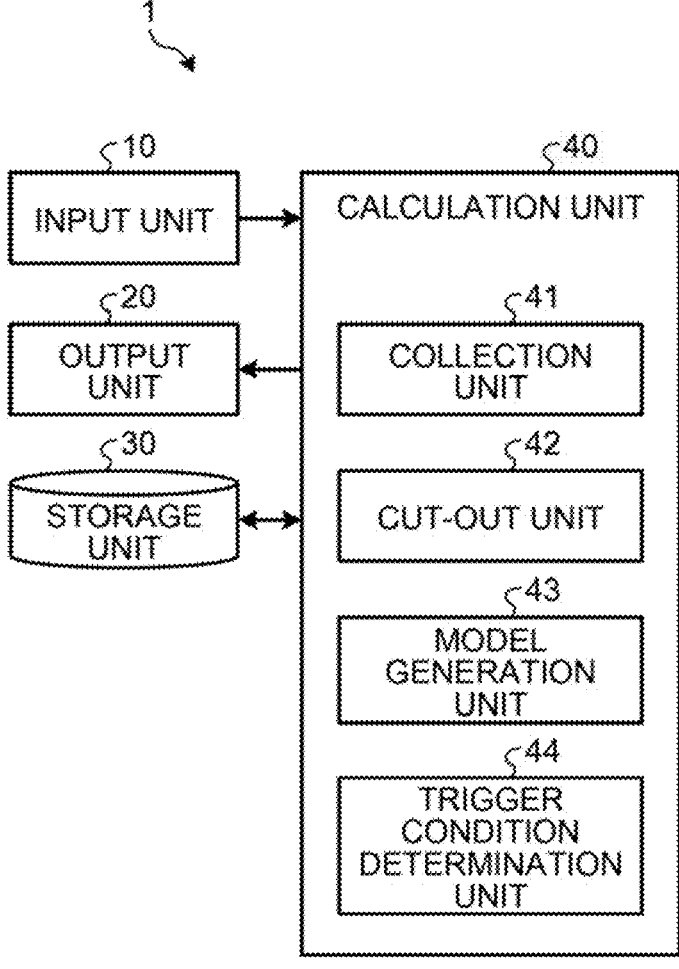
FIG. 1 is a block diagram illustrating a schematic configuration of a trigger condition determination device for a time series signal according to an embodiment of the present invention.

A trigger condition determination method for a time series signal, an abnormality diagnosis method for a monitored facility, and a trigger condition determination device for a time series signal (hereinafter, referred to as "learning device") according to an embodiment of the present invention will be described with reference to the drawings.

(Trigger Condition Determination Device)

The trigger condition determination device is a device that determines a trigger condition being a condition for cutting out a monitored section from a monitored signal, upon abnormality diagnosis of the monitored facility in a production facility of a factory or the like and an experimental facility of a laboratory or the like.

Here, as described above, the monitored signal represents a time series signal indicating a condition of the monitored signal. The monitored signal differs depending on the type of the monitored facility. For example, when the monitored facility is a "motor," a current, speed, or the like of the motor is used as the monitored signal. The trigger condition determination device constantly collects one or more monitored signals and trigger candidate signals corresponding thereto. The trigger candidate signal is a time series signal related to the monitored facility and indicates a time series signal detected at the same hour as the monitored signal.

Typically, when a single or multiple conditions are satisfied, a facility desired to be monitored starts operation. The trigger candidate signal represents this condition and is a signal, such as on or off. If the trigger condition is known in advance, it is easy to cut out the monitored section. However, in a case where there are a large number of various pieces of a facility with complex operations, this trigger condition may not be readily determined. Alternatively, in some cases, a database may not necessarily capture the trigger candidate signal directly indicating the trigger condition but may capture only an indirect signal.

Therefore, a signal group that defines a facility operation condition is selected as the trigger candidate signal, a rule for operation start is extracted from histories of these signals by machine learning or the like, and the condition for cutting out a monitored section is determined. In addition, the trigger candidate signal is desirably a signal not directly related to an abnormality of a target process, a facility, or the like, and various command values, a signal indicating on/off of a specific event, and the like are selected as candidates for the trigger candidate signal. However, the trigger candidate signal may include the monitored signal itself.

In addition, the monitored section indicates a section of the monitored signal that is cut out for abnormality diagnosis. When the monitored section is cut out from the monitored signal, the time (hereinafter, referred to as "cut-out start time point") at which cutting out the monitored signal is started and a width of the cutout are specified. At that time, the cut-out start time point is specified with a value of the trigger candidate signal collected simultaneously with the monitored signal. The width of the cutout differs depending on the type of the monitored facility. For example, when the monitored facility is a "motor," a section in which the motor accelerates may be specified as the width of the cutout. Alternatively, in a product manufacturing process, a duration from the start of manufacturing to the end of manufacturing can be specified as the width of the section.

Furthermore, the trigger condition is a condition for cutting out the monitored section that is the target for abnormality diagnosis, from the monitored signal, and specifically, the trigger condition represent the cut-out start time point and the width of the cutout of the monitored signal.

The trigger condition determination device 1 is implemented by a general-purpose information processing apparatus such as a personal computer or a workstation, and includes an input unit 10, an output unit 20, a storage unit 30, and a calculation unit 40.

The input unit 10 is input means for the calculation unit 40, and is implemented by a data collection device, a keyboard, a pointing device, or the like. Furthermore, the output unit 20 is implemented by a liquid crystal display or the like. The storage unit 30 is implemented by a hard disk device or the like. The storage unit 30 stores, for example, data (the monitored signal, the trigger candidate signal, the trigger condition, a learning model, etc.) processed by the calculation unit 40.

The calculation unit 40 is implemented by, for example, a processor including a central processing unit (CPU) and the like and a memory (main storage unit) including a random access memory (RAM), a read only memory (ROM), and the like. The calculation unit 40 executes a program loaded into a work area of the main storage unit, and controls each component unit and the like through execution of the program, thereby implementing a function matching a predetermined purpose.

In addition, the calculation unit 40 functions as a collection unit (collection means) 41, a cut-out unit (cut-out means) 42, a model generation unit (model generation means) 43, and a trigger condition determination unit (trigger condition determination means) 44 through the execution of the programs described above. Note that each unit will be described later in detail (see FIGS. 2 to 8).

(Trigger Condition Determination Method)

The trigger condition determination method according to the present embodiment will be described with reference to FIGS. 2 to 8. The trigger condition determination method includes a collection step, a cut-out step, a model generation step, and a trigger condition determination step, and performs the steps in this order. Furthermore, in the trigger condition determination method, the cut-out step and the model generation step are repeated if necessary, as described later.

<Collection Step>

In the collection step, the collection unit 41 collects the signal groups each including the monitored signal and the trigger candidate signal (Step S1). Note that here, a plurality of the monitored signals that is collected by the collection unit 41 will be described, but one monitored signal may be collected by the collection unit 41.

<Cut-Out Step>

In the cut-out step, the cut-out unit 42 cuts out the monitored section of the monitored signal, based on a predetermined criterion, from the signal group collected in the collection step. The cut-out step will be described in detail below.

Figure 3:
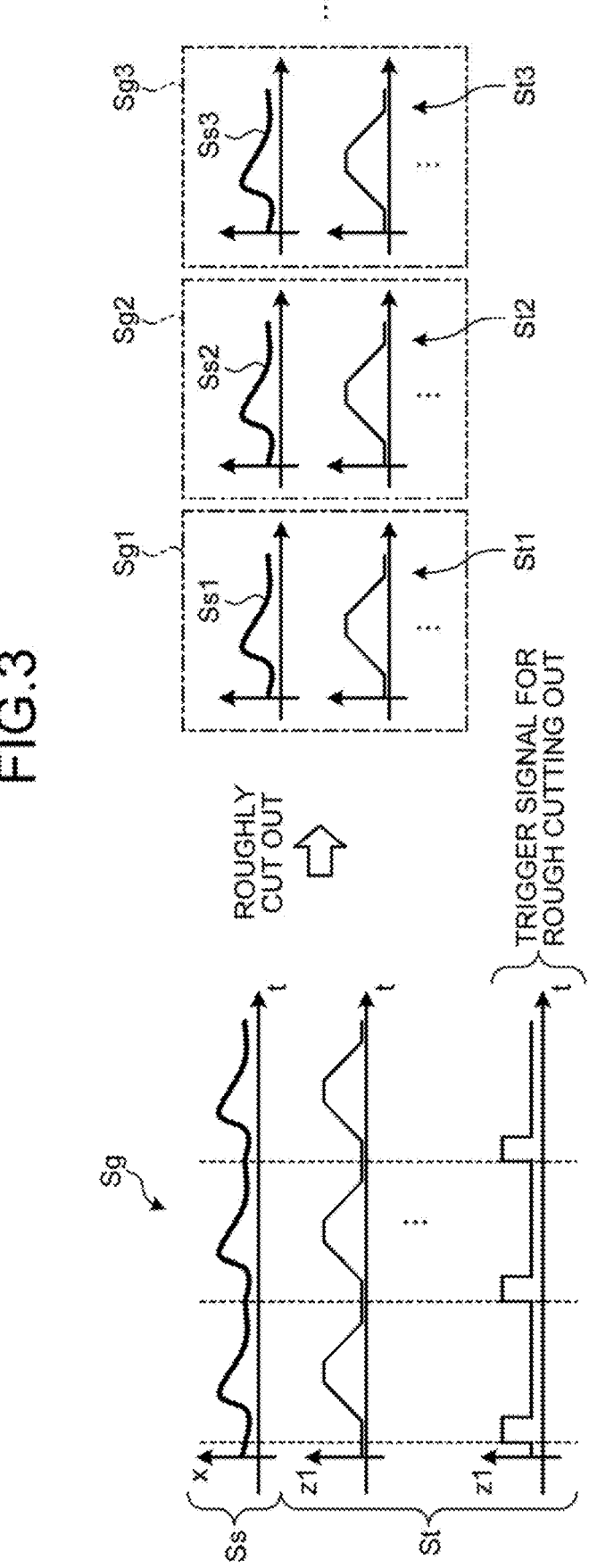
FIG. 3 is a diagram schematically illustrating a content of a cut-out step of the trigger condition determination method for a time series signal according to an embodiment of the present invention.

First, as illustrated in FIG. 3, the cut-out unit 42 roughly cuts out the signal group (Step S2). For example, in a facility that performs repeated operations, such as coil rolling facility, the monitored signal and the trigger candidate signal about a continuously wound coil are continuously acquired without interruption. Therefore, in Step S2, for example, in order to divide the monitored signal and the trigger candidate signal for each coil, the signal group is roughly cut out. Note that the roughly cutting out the signal group may be performed with timing set in advance according to the type of the monitored facility, or, as illustrated in the drawing, a signal for rough cutting out may be selected from a plurality of the trigger candidate signals to roughly cut out the signal group at timing with which the signal for rough cutting out rises.

Note that in FIG. 3, a reference symbol Sg denotes a signal group before rough cutting out, a reference symbol Ss denotes a monitored signal before rough cutting out, a reference symbol St denotes a trigger candidate signal before rough cutting out, reference numerals Sg1, Sg2, and Sg3 denote signal groups after rough cutting out, reference numerals Ss1, Ss2, and Ss3 denote monitored signals after rough cutting out, and reference numerals St1, St2, and St3 denote trigger candidate signals after rough cutting out.

Next, as illustrated in FIG. 4(a), the cut-out unit 42 selects one monitored signal (monitored signal Ss1 to in the drawing) from the plurality of the monitored signals roughly cut out in Step S2, and cuts out a monitored section Sm1 of the selected monitored signal Ss1 (Step S3). A cut-out condition for cutting out the monitored section Sm1 in Step S3 is determined based on a facility characteristic of the monitored facility. For example, when the monitored facility is a "motor" and the monitored signal Ss1 is a "current value of the motor" and it is determined whether a degree of increase in the current value of the motor in acceleration of the motor is normal, a section in which the motor accelerates is set as the monitored section Sm1, as illustrated in the drawing. In other words, a time point at which the motor starts acceleration is specified as the cut-out start time point of the monitored section Sm1, and a section from the start of the acceleration of the motor to the end of the acceleration is specified as the width of the cutout.

Next, the cut-out unit 42 calculates a correlation coefficient between a waveform included in the monitored section Sm1 cut out in Step S3 and waveforms included in the other monitored signals Ss2 and Ss3 (Step S4). Next, as illustrated in FIG. 4(b), the cut-out unit 42 searches for a section having a largest correlation coefficient with the waveform included in the monitored section Sm1 that is cut out in Step S3, for each of the other monitored signals Ss2 and Ss3, thereby cutting out monitored sections Sm2 and Sm3 of the monitored signals Ss2 and Ss3 (Step S5).

As described above, in steps S4 and S5, the waveforms included in the monitored signals at other times that have roughly cut out in Step S2 are searched for waveforms similar to the waveform included in the monitored section Sm1 that is cut out in Step S3. Note that the method of searching for a similar waveform may use a Euclidean distance or the like between data of the time series signals, in addition to the comparison between correlation coefficients described above.

<Model Generation Step>

In the model generation step, for each of the signal groups (the plurality of the monitored signals), a learning model is generated that specifies the start time point of a monitored section that is desired to be cut out, in advance, generates label data in which a label for the start time point is turned on and a label for any other time point is turned off, and uses each value of one or more trigger candidate signals at each time point as an input and the label data at each time point as an output, by using machine learning.

In the model generation step, as illustrated in FIG. 5, for each signal group, the model generation unit 43 first assigns a label "trigger-on" to the values of the monitored signals Ss1, Ss2, and Ss3 and values of the trigger candidate signals St1, St2, and St3 (hereinafter, referred to as "values of the signal group"), respectively corresponding to start time point points p1, p2, and p3 of the cut-out monitored sections Sm1, Sm2, and Sm3, and assigns a label "trigger-off" to values of the signal group corresponding to time points other than the start time points of the cut-out monitored sections Sm1, Sm2, and Sm3 (Step S6). The label "trigger-on"

indicates that the values of the signal group to which this label is assigned represent the cut-out start time point, and the label "trigger-off" indicates that the values of the signal group to which this label is assigned do not represent the cut-out start time point.

Figure 6:
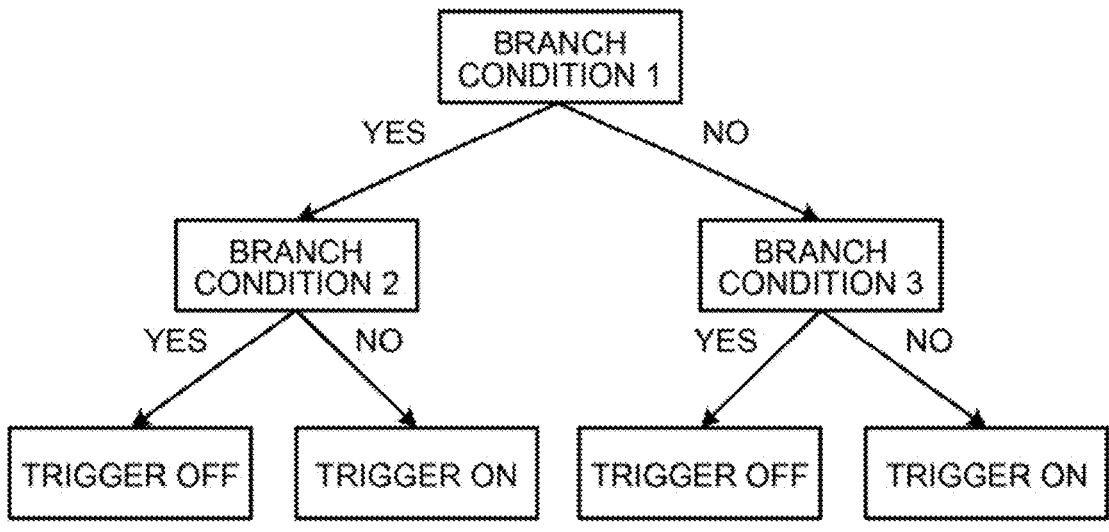
FIG. 6 is a diagram schematically illustrating a decision tree generated in the model generation step of the trigger condition determination method for a time series signal according to the embodiment of the present invention.

Next, by machine learning using the values of the signal group to which the label "trigger-on" is assigned and the values of the signal group to which the label "trigger-off" is assigned as inputs, and using the label "trigger-on" and the label "trigger-off" as outputs, the model generation unit 43 generates a decision tree as illustrated in FIG. 6 (Step S7).

Specifically, the decision tree can be generated using training data in which objective variables are the labels "trigger-on" and "trigger-off," and explanatory variables are the values of the trigger candidate signals corresponding to the time points of "trigger-on" and "trigger-off." Here, "trigger-on" may be set to "1," and "trigger-off" may be set to "0," and may be handled as a function. In addition, various machine learning models other than the decision tree can also be used. Therefore, the learning model generated in Step S7 is not limited to the decision tree, and may be, for example, a random forest, a neural network, or the like. Here, "trigger-on" may be set to "1," and "trigger-off" may be set to "0," and may be handled as a function.

Figure 7:
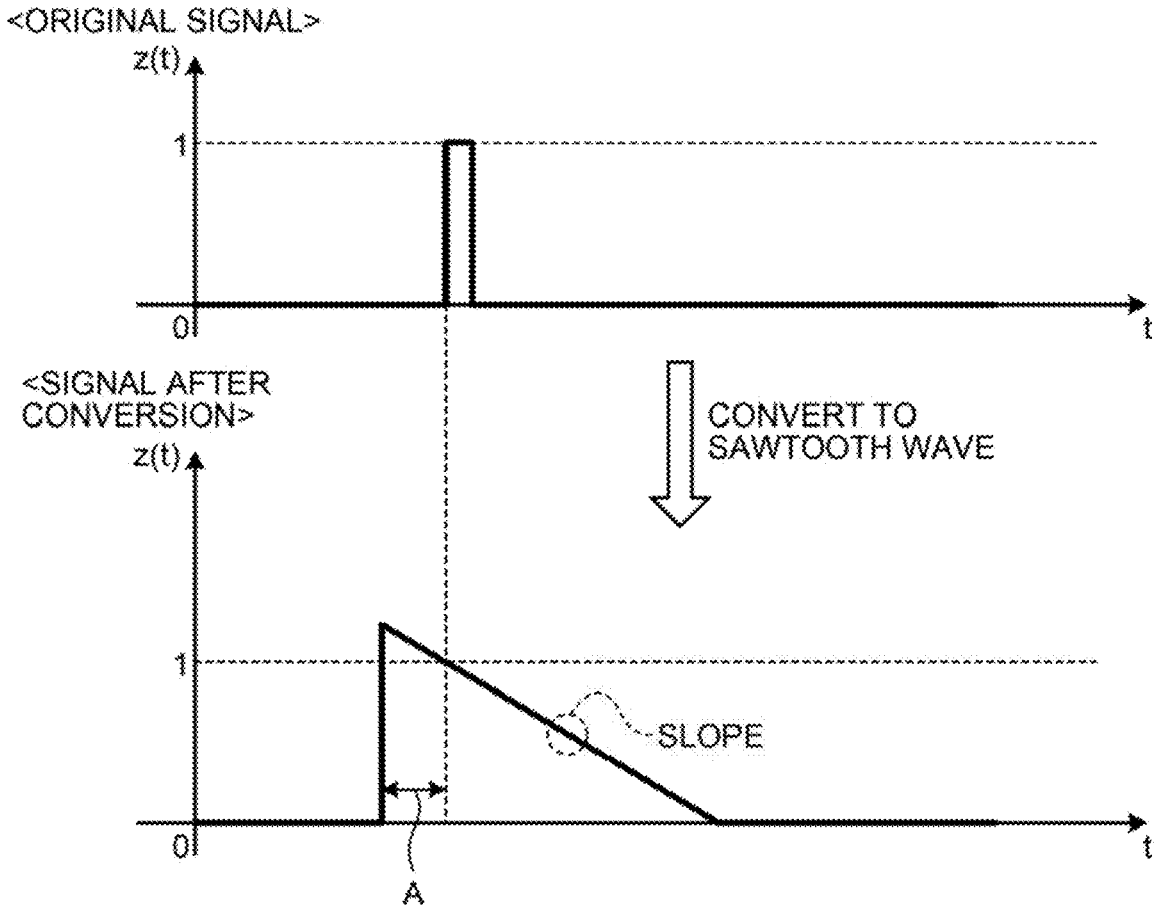
FIG. 7 is a diagram schematically illustrating how one pulse signal is converted to a sawtooth wave in the model generation step of the trigger condition determination method for a time series signal according to the embodiment of the present invention.

Here, in the model generation step, when the trigger candidate signal included in the signal group is one pulse signal, that is, a signal that is turned on only during one scan of the rising or falling of a signal of an on-off signal, as illustrated in an upper diagram of FIG. 7, the machine learning is performed after the trigger candidate signal is converted to a sawtooth wave as illustrated in the lower diagram of FIG. 7.

As illustrated in the upper diagram of FIG. 7, the one pulse signal is a signal that is turned on only for a short time. Therefore, in the cut-out step described above, when searching for a portion having a high similarity in waveform, one pulse signal is supposed to turn on together with "trigger-on," but the "trigger-on" is shifted before or after the time of turning on of the one pulse signal, in some cases. Meanwhile, as illustrated in the drawing, converting the one pulse signal into the sawtooth wave makes it possible to eliminate the trouble of the one pulse signal due to on/off delay.

A slope of the sawtooth wave after conversion is determined according to, for example, whether the one pulse signal is desired to be checked for how many seconds, after the one pulse signal is turned on, and is set to a slope that does not overlap the rise of a next signal. In addition, when the one pulse signal is converted to the sawtooth wave, it is desirable to provide a sufficient time (e.g., approximately 5 scans), against starting the cutting out of the monitored section before the one pulse signal is turned on due to the shift of a starting point of the cutting out, as illustrated in a portion A of FIG. 7.

Figure 8:
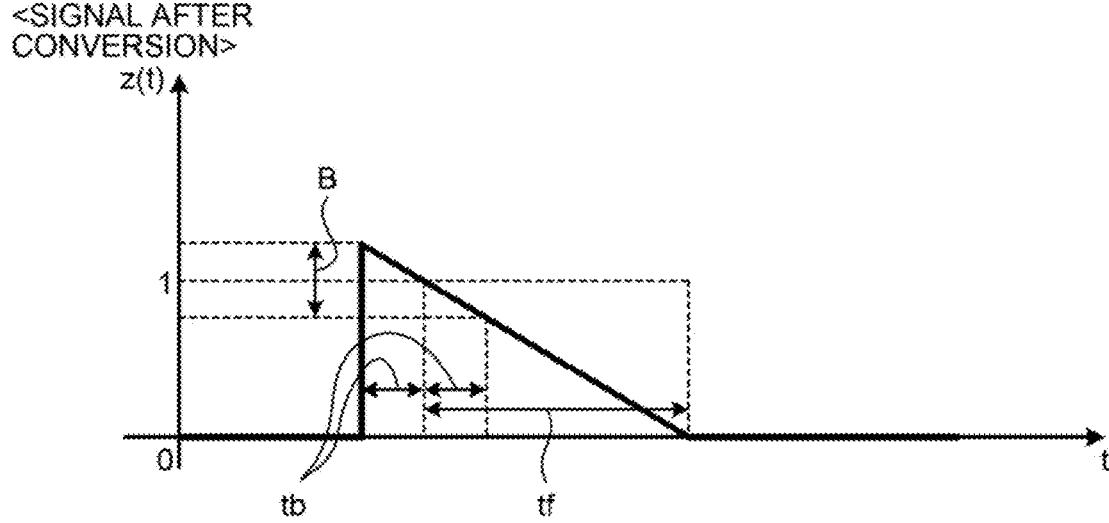
FIG. 8 is a graph schematically illustrating the sawtooth wave converted in the model generation step of the trigger condition determination method for a time series signal according to the embodiment of the present invention.

Furthermore, as illustrated in FIG. 8, the shape of the sawtooth wave is defined by parameters tf and tb, but a relationship between the parameters tf and tb is desirably tb<tf. In addition, in the sawtooth wave, as illustrated in the drawing, when a value z of a signal after conversion is within a range indicated by B, trigger-on is determined In the model generation step, when an error occurs in which the trigger condition cannot be normally generated in machine learning, when accuracy in determination provides no predetermined value, or the like, the process returns to the cut-out step described above, the monitored section that has been cut out last time is shifted back and forth, a new monitored section of the monitored signal is cut out, and the model generation step is performed again. In other words, after the monitored section of the monitored signal is cut out again, the decision tree is constructed again. Then, when the trigger condition can be normally generated in machine learning, the model generation step is finished, and when the trigger condition cannot be normally generated, the process returns to the cut-out step again, and the cut-out step and the model generation step are performed again.

As illustrated in FIG. 4, the trigger condition determination method according to the present embodiment is a process of learning a condition of the trigger candidate signal at the start time point of the monitored section (monitored section Sm1) initially specified in the cut-out step. Therefore, for example, when the condition of the trigger candidate signal has no feature at the start time point of the monitored section specified first, learning cannot be performed well. Therefore, as described above, when an error occurs in the model generation step, the monitored section specified first in the cut-out step is shifted back and forth, the monitored section is specified again, thereby solving the problem in learning.

<Trigger Condition Determination Step>

In the trigger condition determination step, the trigger condition determination unit 44 determines the trigger condition, for the monitored signal for which the abnormality diagnosis is performed, by using the decision tree (Step S8). In other words, the trigger condition determination unit 44 is configured to know the timing of "trigger-on" by inputting the trigger candidate signal to the decision tree, and timing for starting monitoring the monitored signal for which the abnormality diagnosis is performed can be extracted. Here, when the decision tree is used in Step S8, the conditions of the generated decision tree can be rearranged and rewritten, thereby briefly describing the trigger conditions (see FIG. 11 which is described later). In this way, using the decision tree generated in Step S7 makes it possible to readily understand what conditions of the monitored signal and trigger candidate signal provide trigger-on. In addition, even when a learning model other than the decision tree is used, it is preferable to set timings with which outputs of "trigger-on" are obtained in response to sequential inputs of the trigger candidate signals being the explanatory variables at time points, as the timings of "trigger-on."

(Abnormality Diagnosis Method for Equipment to be Monitored)

In the abnormality diagnosis method for a monitored facility, according to the trigger condition determined by the trigger condition determination method, a signal in the monitored section is cut out from the monitored signal, the signals are accumulated in the storage unit 30, performing abnormality diagnoses for the monitored facility based on the accumulated signals.

According to the trigger condition determination device, the trigger condition determination method, and the abnormality diagnosis method for a monitored facility according to the present embodiment, as described above, it is possible to automatically determine the trigger condition for cutting out the monitored section from the monitored signal by using the learning model that has trained to learn whether trigger-on is provided when the monitored signal and the trigger candidate signal have what condition. In addition, according to the trigger condition determination device, the trigger condition determination method, and the abnormality diagnosis method for a monitored facility according to the present embodiment, the trigger condition for cutting out the monitored section of the monitored signal can be automatically determined. Therefore, it is not necessary to manually examine and determine the trigger condition, simplifying preliminary preparation required for abnormality diagnosis for the monitored facility.

EXAMPLES

Figure 9:
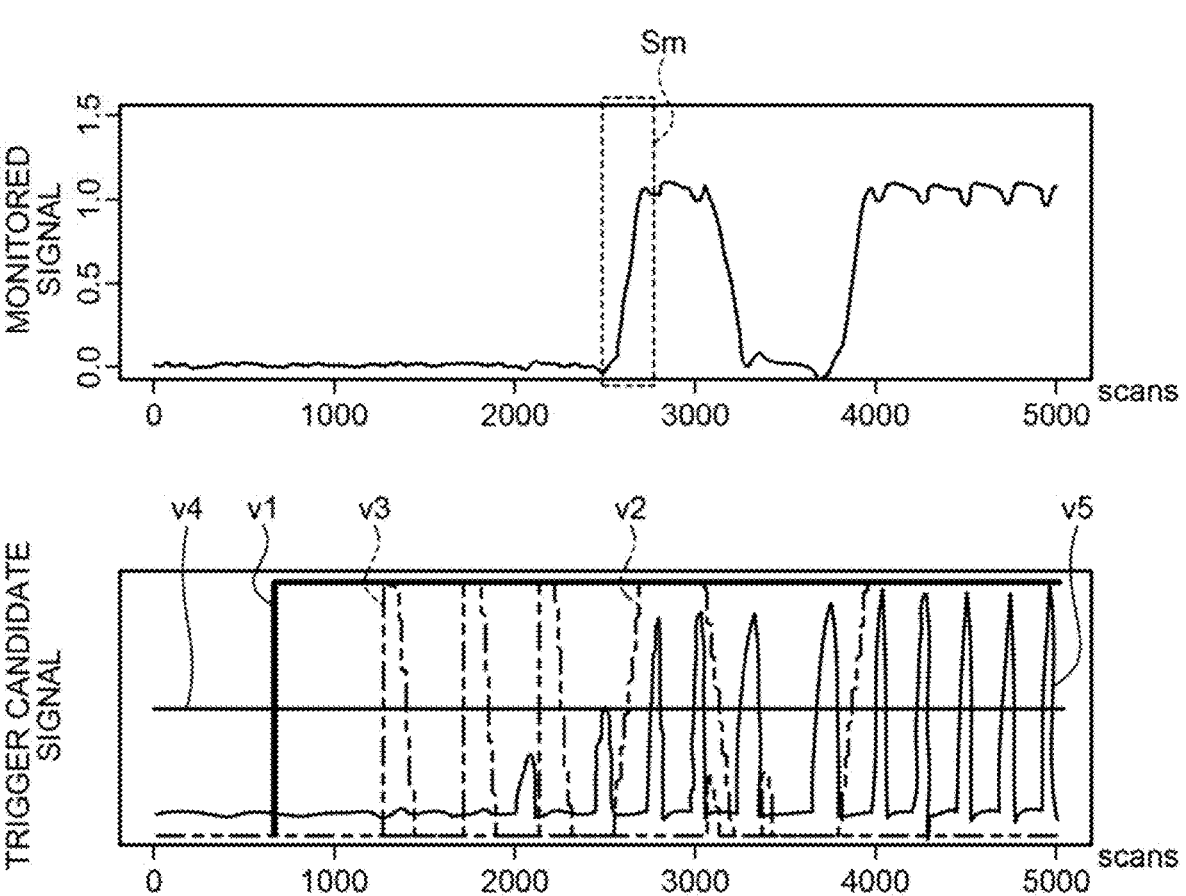
FIG. 9 is a diagram illustrating a monitored signal and a trigger candidate signal in an example of the trigger condition determination method for a time series signal according to an embodiment of the present invention.

An example of an operation result prediction method according to the present invention will be described with reference to FIGS. 9 to 12. In the present example, sizing press facility is set as the monitored facility, and the present invention is applied to a speed record of a main motor of the sizing press facility. FIG. 9 illustrates the monitored signal and the trigger candidate signal in the present example.

In FIG. 9, the monitored signal is the speed record of the main motor, and the following five items were selected as trigger candidate signals.

v1: On upon press loading v2: Speed command value for main motor v3: Speed command value for width adjustment motor (downstream side of drive)

v4: On during pressing v5: Sum of loads on press load cell

Figure 10:
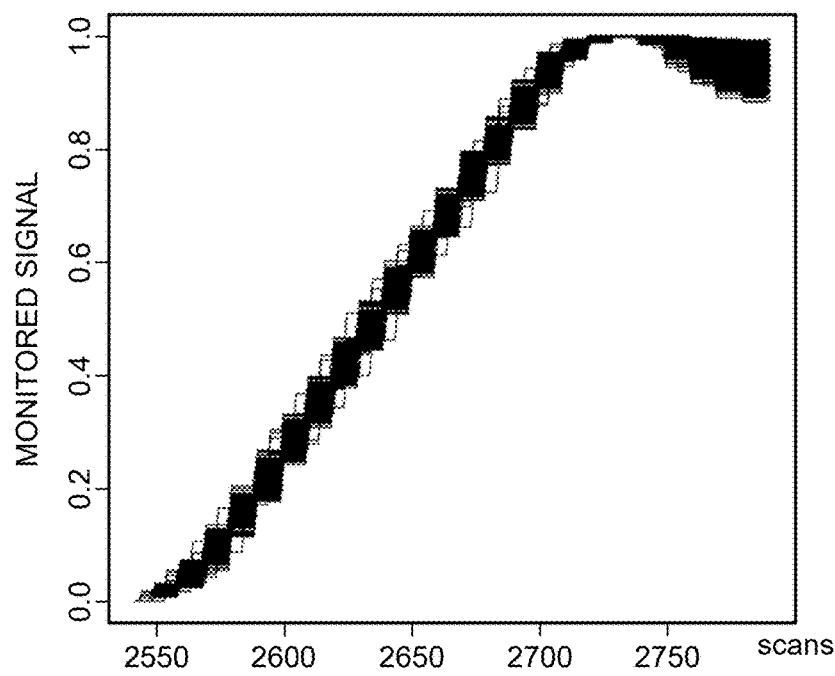
FIG. 10 is a graph illustrating how waveforms of the cut-out monitored sections are superimposed in an example of the trigger condition determination method for a time series signal according to an embodiment of the present invention.

As illustrated in FIG. 9, an interval between 2500 scans and 2800 scans was first specified as a monitored section Sm in order to check the rising of the signal. Furthermore, a graph obtained by superimposing portions having maximum correlation coefficients, cut out from a waveform included in the monitored signal at other times is illustrated in FIG. 10, a decision tree constructed in the model generation step is illustrated in FIG. 11, and a graph obtained by superimposing the monitored signals (speed record of the main motor), cut out based on the trigger condition extracted from the decision tree in the cut-out condition determination step is illustrated in FIG. 12.

Figure 11:
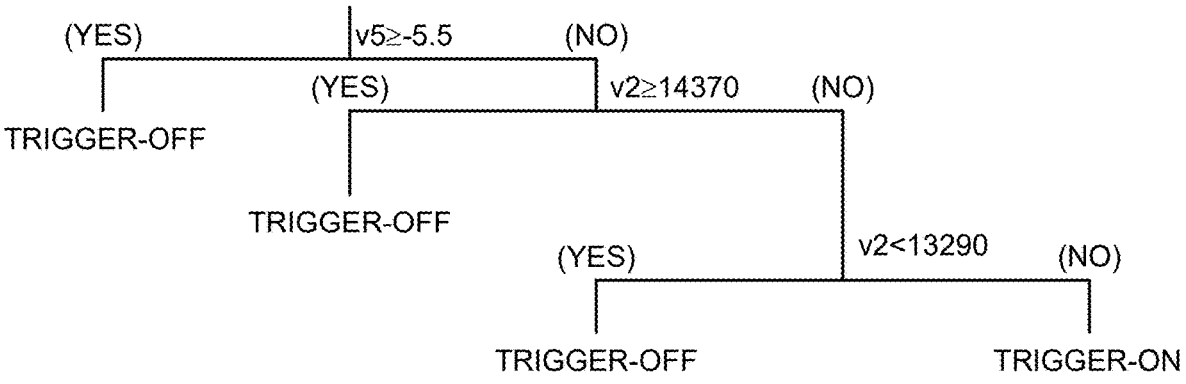
FIG. 11 is a diagram of the trigger condition determination method illustrated using a decision tree in the example of the trigger condition determination method for a time series signal according to an embodiment of the present invention.
Figure 12:
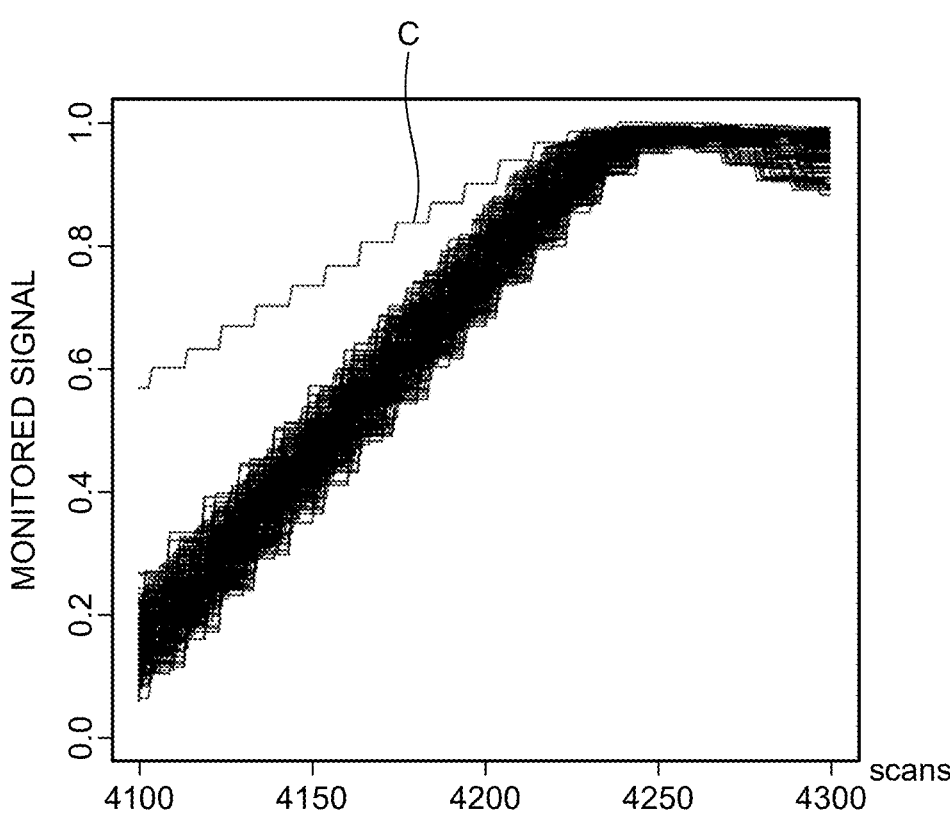
FIG. 12 is a graph illustrating how waveforms of the cut-out monitored sections are superimposed in an example of the trigger condition determination method for a time series signal according to an embodiment of the present invention.

As illustrated in FIG. 11, two conditions "v5<−5.5" and "13290≤v2<14370" were extracted from the decision tree constructed in the model generation step. The condition "13290≤v2<14370" including the speed command value v2 for the main motor was selected, in consideration that the monitored signal is the speed record of the main motor, and "the speed command value v2 for the main motor=13830" was determined as the trigger condition. Then, cutting out the monitored section of the monitored signal for which abnormality diagnosis is performed, based on this trigger condition allowed superimposition of the cut out waveforms, as illustrated in FIG. 12. Furthermore, FIG. 12 includes a waveform that deviates from the other waveforms (see a waveform C), but there is a possibility that such a waveform may be determined as an abnormality candidate by analysis using a statistic such as the Q statistic.

In this way, determining the trigger condition and, for example, performing principal component analysis or the like of normal data extracted from collected record data allows construction of a normal model for abnormality diagnosis. Furthermore, during normal operation, the statistic such as the Q statistic based on the normal model is obtained for a signal extracted under the trigger condition, and whereby abnormality diagnosis can be performed.

Note that in the present example, the monitored facility being the sizing press facility in an iron-making process, particularly in a hot rolling mill has been described. However, the scope of application of the present invention is not limited to this field, but the present invention can be applied to a production facility for any manufacturing process of petroleum-related products, chemicals, and the like, an experimental facility for research institutions, and the like.

As described above, the trigger condition determination method for a time series signal, the abnormality diagnosis method for a monitored facility, and the trigger condition determination device for a time series signal according to the present invention have been specifically described with reference to the embodiments for carrying out the invention and examples. However, the gist of the present invention is not limited to these descriptions, and should be broadly interpreted based on the claims. Furthermore, it will naturally be understood that various changes and modifications made based on the descriptions may be included in the scope of the present invention.

REFERENCE SIGNS LIST

1 TRIGGER CONDITION DETERMINATION DEVICE
10 INPUT UNIT
20 OUTPUT UNIT
30 STORAGE UNIT
40 CALCULATION UNIT
41 COLLECTION UNIT (COLLECTION MEANS)
42 CUT-OUT UNIT (CUT-OUT MEANS)
43 MODEL GENERATION UNIT (MODEL GENERATION MEANS)
44 TRIGGER CONDITION DETERMINATION UNIT (TRIGGER CONDITION DETERMINATION MEANS)

The invention claimed is:

1. A trigger condition determination method for a time series signal, the method determining a trigger condition that is a condition for cutting out a monitored section being a target for abnormality diagnosis, from a monitored signal being a time series signal indicating a condition of a monitored facility in the abnormality diagnosis for the monitored facility, the method comprising:

a collection step of collecting signal groups including one or more monitored signals and a trigger candidate signal, the one or more monitored signals relating to the monitored facility, the trigger candidate signal being a time series signal relating to the monitored facility and detected at a same time as the monitored signal, and representing a time series signal that is able to be the trigger condition;

a cut-out step of cutting out the monitored section of the monitored signal, based on a predetermined criterion, from the signal groups;

a model generation step of generating, for the signal groups, a learning model specifying a start time point of the cut-out monitored section, generating label data in which a label for the start time point is turned on and a label for any other time point is turned off, and using one or more trigger candidate signals at each time point as an input and using the label data at each time point as an output, by using machine learning; and a trigger condition determination step of determining the trigger condition by using the learning model, for the monitored signal for which the abnormality diagnosis is performed.

2. The trigger condition determination method for a time series signal according to claim 1, wherein in the cut-out step, a monitored section is cut out based on a facility characteristic of the monitored facility, from a first monitored signal, selected from a plurality of the monitored signals collected in the collection step; and a section having a largest correlation coefficient with a waveform included in the monitored section of the first monitored signal is searched for to cut out the monitored section, from each of the monitored signals other than the first monitored signal, of the plurality of the monitored signals.

3. The trigger condition determination method for a time series signal according to claim 1, wherein the learning model is a decision tree.

4. The trigger condition determination method for a time series signal according to claim 1, wherein in the model generation step, when the trigger candidate signal is one pulse signal, the machine learning is performed after the trigger candidate signal is converted to a sawtooth wave.

5. The trigger condition determination method for a time series signal according to claim 1, wherein in the model generation step, when accuracy in determination provides no predetermined value in the machine learning, the process returns to the cut-out step, the monitored section that has been cut out last time is shifted back and forth, a new monitored section of the monitored signal is cut out, and the model generation step is performed again.

6. An abnormality diagnosis method for a monitored facility, comprising:

cutting out and accumulating signals in a monitored section being a target for abnormality diagnosis, from a monitored signal being a time series signal indicating a condition of a monitored facility, according to a trigger condition determined by the trigger condition determination method for a time series signal according to claim 1; and performing the abnormality diagnosis for the monitored facility based on the accumulated signals.

7. A trigger condition determination device for a time series signal, the device determining a trigger condition that is a condition for cutting out a monitored section being a target for abnormality diagnosis, from a monitored signal being a time series signal indicating a condition of a monitored facility in abnormality diagnosis for the monitored facility, the device comprising:

a collection unit configured to collect signal groups including one or more monitored signals and a trigger candidate signal, the one or more monitored signals relating to the monitored facility, the trigger candidate signal being a time series signal relating to the monitored facility and detected at a same time as the monitored signal, and representing a time series signal that is able to be the trigger condition;

a cut-out unit configured to cut out the monitored section of the monitored signal, based on a predetermined criterion, from the signal group;

a model generation unit configured to, for the signal group, generate a learning model specifying a start time point of the cut-out monitored section, generate label data in which a label for the start time point is turned on and a label for any other time point is turned off, and use one or more trigger candidate signals at each time point as an input and using the label data at each time point as an output, by using machine learning; and a trigger condition determination unit configured to determine the trigger condition by using the learning model, for the monitored signal for which the abnormality diagnosis is performed.

* * * * *